US012340814B2

(12) United States Patent
Brown et al.

(10) Patent No.: US 12,340,814 B2
(45) Date of Patent: Jun. 24, 2025

(54) AUDIO WATERMARK TO INDICATE POST-PROCESSING

(71) Applicant: Dolby Laboratories Licensing Corporation, San Francisco, CA (US)

(72) Inventors: C. Phillip Brown, Castro Valley, CA (US); Brett G. Crockett, Brisbane, CA (US); Baoli Yan, Beijing (CN); Qi Huang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 241 days.

(21) Appl. No.: 17/922,724

(22) PCT Filed: May 6, 2021

(86) PCT No.: PCT/US2021/031103

§ 371 (c)(1),
(2) Date: Nov. 1, 2022

(87) PCT Pub. No.: WO2021/226342

PCT Pub. Date: Nov. 11, 2021

(65) Prior Publication Data

US 2023/0162743 A1 May 25, 2023

Related U.S. Application Data

(60) Provisional application No. 63/027,286, filed on May 19, 2020.

(30) Foreign Application Priority Data

May 6, 2020 (WO) ................ PCT/CN2020/088816
May 29, 2020 (EP) .................................... 20177393

(51) Int. Cl.
*G10L 19/018* (2013.01)
*G10L 25/51* (2013.01)
*G10L 19/008* (2013.01)

(52) U.S. Cl.
CPC ............ *G10L 19/018* (2013.01); *G10L 25/51* (2013.01); *G10L 19/008* (2013.01)

(58) Field of Classification Search
CPC ............................ G10L 19/018; G10L 19/008
See application file for complete search history.

(56) References Cited

U.S. PATENT DOCUMENTS 6,330,673 B1 12/2001 Levine
9,311,923 B2 4/2016 Radhakrishnan
(Continued)

FOREIGN PATENT DOCUMENTS

WO 2012075246 A2 6/2012
WO 2018177608 A1 10/2018
WO 2018177613 A1 10/2018

OTHER PUBLICATIONS

Kim, et al. "Transient detection-based adaptive audio watermarking using attack-aware optimization," Elsevier Inc. 2023. (Year: 2023).*
(Continued)

*Primary Examiner* — Feng-Tzer Tzeng

(57) ABSTRACT

A system for using an audio watermark to avoid double processing. The decoder inserts the audio watermark during a transient in the audio signal. This avoids the drawbacks of using out-of-band control signals or metadata. The decoder performs detecting a transient in a first audio signal, transforming a portion related to the transient into the frequency domain to compare a first band of the frequency domain data and a second band of the frequency domain data, when the first band is uncorrelated with the second band, the decoder performs processing on the first audio data to generate a
(Continued)

second audio data, when the first band is correlated, the first audio data is used as the second audio data without performing any processing.

20 Claims, 5 Drawing Sheets

(56) References Cited

U.S. PATENT DOCUMENTS

| | | | | |
|---|---|---|---|---|
| 9,564,139 | B2 | 2/2017 | Radhakrishnan | |
| 9,646,616 | B2 | 5/2017 | Virette | |
| 9,818,415 | B2 | 11/2017 | Nurmukhanov | |
| 2003/0154379 | A1 | 8/2003 | Kawano | |
| 2016/0111102 | A1* | 4/2016 | Radhakrishnan | G10L 19/018 700/94 |
| 2017/0018278 | A1* | 1/2017 | Srinivasan | G10L 19/018 |

OTHER PUBLICATIONS

ATSC AC-3, E-AC-3 Digital Audio Compression Standard, revision B, Document A/52B, Jun. 14, 2005.

ATSC Standard: Digital Audio Compression (AC-3, E-AC-3) Mar. 23, 2012.

ETSI TS 102 366 V1.21. Digital Audio Compression (AC-3, Enhanced AC-3) Standard, Aug. 2008.

Petrovic R. "Audio Signal Watermarking Based on Replica Modulation" Telcommunications in Modern Satellite, Cable and Broadcasting Service, Sep. 2001, vol. 1, pp. 227-234.

* cited by examiner

AUDIO WATERMARK TO INDICATE POST-PROCESSING

CROSS REFERENCE TO RELATED APPLICATIONS

This application claims priority of European Patent Application No. 20177393.4 filed May 29, 2020, U.S. Provisional Patent Application No. 63/027,286 filed May 19, 2020, and PCT Application No. PCT/CN2020/088816 filed May 6, 2020, all of which are incorporated herein by reference in their entirety.

FIELD

The present disclosure relates to audio processing, and in particular, to using audio watermarks to indicate audio processing.

BACKGROUND

Unless otherwise indicated herein, the approaches described in this section are not prior art to the claims in this application and are not admitted to be prior art by inclusion in this section.

Media players are becoming more configurable, including the media players implemented in mobile telephones. The media player may include a variety of decoders, pre-processors, post-processors, etc. that perform various types of audio processing (e.g., according to user selection, preferences, machine learning, etc.).

A selected type of audio processing may be performed by components at more than one point in the audio processing chain. This results in the possibility that more than one component may perform the processing, resulting in double processing of the audio. One problem of double processing is that it consumes extra resources (electricity, processor cycles, battery life, etc.), which is especially undesirable in a mobile device. Another problem of double processing is that the double-processed audio may have a perceptible difference from (single) processed audio, resulting in a negative user experience.

One way to avoid double processing is to communicate between components that the processing has been performed. This communication may be via control signals, control messages, metadata, etc.

SUMMARY

One issue with using control signals, control messages, metadata, etc. to communicate between components is that these communications must conform to the inter-component communication requirements of the mobile device operating system. For example, for security purposes, the operating system may not allow the communications to be passed directly between components, but instead may require the communications to be intermediated by a security component. This involves extra effort in many ways. First, instead of concentrating on the audio processing aspects, the audio component developer also needs to maintain expertise in the security aspects of the operating system. Second, if the operating system modifies its security system, the audio component developer is required to update the audio processing component to conform, even if there is otherwise no effect on the operational details of the audio processing. As a specific example, in the Android™ operating system, audio metadata cannot go through the Android™ audio chain directly due to the design of the Android™ architecture.

Given the above, there is a need to communicate information regarding double processing in ways other than using control signals, control messages, metadata, etc. between audio processing components. Described herein are techniques related to detecting double processing using audio watermarking.

According to an embodiment, a method of audio processing comprises detecting, by a processing component, a transient in first audio data. The method further comprises transforming a portion of the first audio data related to the transient into frequency domain data. The method further comprises comparing a first band of the frequency domain data and a second band of the frequency domain data. When the first band is uncorrelated with the second band, the method further comprises performing processing by the processing component on the first audio data to generate second audio data. When the first band is correlated with the second band, the method further comprises using the first audio data as the second audio data without performing processing by the processing component. In this manner, the method uses the detected audio watermark to determine whether or not the processing is performed.

The audio watermark may be inserted as per the following method. Prior to detecting the transient in the first audio data (see above), the method further comprises decoding, by a decoder component, third audio data to generate fourth audio data. The method further comprises detecting a transient in the fourth audio data, wherein the transient in the fourth audio data corresponds to the transient in the first audio data. The method further comprises transforming a first portion of the fourth audio data related to the transient in the fourth audio data into first frequency domain data. The method further comprises duplicating a first band of the first frequency domain data into a second band of the first frequency domain data to generate second frequency domain data. The method further comprises transforming the second frequency domain data to generate a second portion. The method further comprises generating fifth audio data, wherein the fifth audio data corresponds to the fourth audio data having the first portion replaced with the second portion. (The fifth audio data corresponds to the first audio data discussed above.)

According to another embodiment, an apparatus for audio processing includes a processor and a memory. The processor is configured to control the apparatus to perform one or more of the method steps discussed above. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

DETAILED DESCRIPTION

Described herein are techniques related to audio watermarking. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e. "either A or B", "at most one of A and B").

Figure 1:
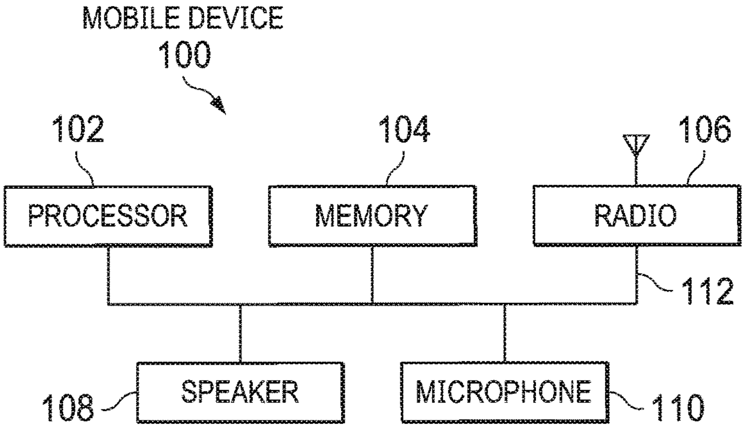
FIG. 1 is a block diagram of a mobile device 100.

FIG. 1 is a block diagram of a mobile device 100. The mobile device 100 may be a media player (e.g., MP3 player, iPod™ device, etc.), mobile telephone (e.g., an Android™ device, an iOS™ device, etc.), etc. The mobile device 100 includes a processor 102, a memory 104, a radio 106, a speaker 108, a microphone 110, and a bus 112. The mobile device 100 may include other components (e.g., a display, a battery, input or output interfaces for data communications or charging, etc.) that for brevity are not discussed in detail.

The processor 102 generally controls the operation of the mobile device 100, The processor 102 may be one or more processors. The processor 102 may execute one or more computer programs, such as the operating system (e.g., the Android™ operating system, the iOS™ operating system, etc.), various application programs (e.g., a media player program, an audio effects program, etc.), etc. The processor 102 may include a digital signal processor (DSP), or may execute computer programs that implement DSP functionality.

The memory 104 generally stores the instructions executed by, and the data operated on, by the processor 102. These instructions and data may include the various computer programs (e.g., the operating system, the applications, etc.), media data (audio data, video data, audiovisual data, etc.), configuration data (e.g., user settings and preferences, etc.), etc. The memory 104 may include volatile components (e.g., random access memory (RAM), etc.), non-volatile components (e.g., read-only memory (ROM), flash memory, etc.), etc.

The radio 106 generally controls wireless data exchange between the mobile device 100 and other wireless devices and networks. The radio 106 may be one or more radios of various types, such as a cellular radio, an IEEE 802.11 standard radio (e.g., WiFi™ radio), an IEEE 802.15.1 standard radio (e.g., Bluetooth™ radio), etc. The radio 106 may function to obtain media content, for example streaming content (e.g., for processing by the processor 102), downloaded content (e.g., for storage by the memory 104), etc. The radio 106 may be omitted in certain embodiments of the mobile device 100 (e.g., when the mobile device 100 is a voice recorder with media player functionality).

The speaker 108 generally outputs sound corresponding to audio data. For example, the speaker 108 may output streamed audio data received by the mobile device 100, stored audio data stored by the mobile device 100, etc. The speaker 108 may be omitted in certain embodiments of the mobile device 100 (e.g., when the mobile device 100 connects to an external speaker via a wired or wireless connection). For example, the mobile device 100 may connect to wireless earbuds via the radio 106.

The microphone 110 generally receives sound that the mobile device 100 may use for various purposes. For example, the microphone 110 may receive background noise that the mobile device 100 may use to adjust how it processes audio data. As another example, the microphone 110 may receive voice commands that the mobile device 100 may use to control the media player functionality or to set user configuration preferences. The microphone 110 may be omitted in certain embodiments of the mobile device 100 (e.g., when the mobile device 100 connects to an external microphone via a wired or wireless connection).

The bus 112 generally connects the other components of the mobile device 100. The bus 112 may include one or more buses having one or more types, such as an inter-integrated circuit ($I^2C$) bus, an inter-integrated circuit sound ($I^2S$) bus, a serial peripheral interface (SPI) bus, etc.

In general, the mobile device 100 implements media player functionality to output media data, including audio data. The mobile device 100 may also implement audio post-processing, such as audio effects, on the audio data. As discussed in more detail below, the mobile device 100 implements an audio watermark to avoid double-processing of audio signals. The mobile device 100 may also implement additional functionality (e.g., telephone functionality, web browser functionality, camera functionality, two-factor authentication functionality, etc.) that for brevity is not described in detail.

Figure 2:
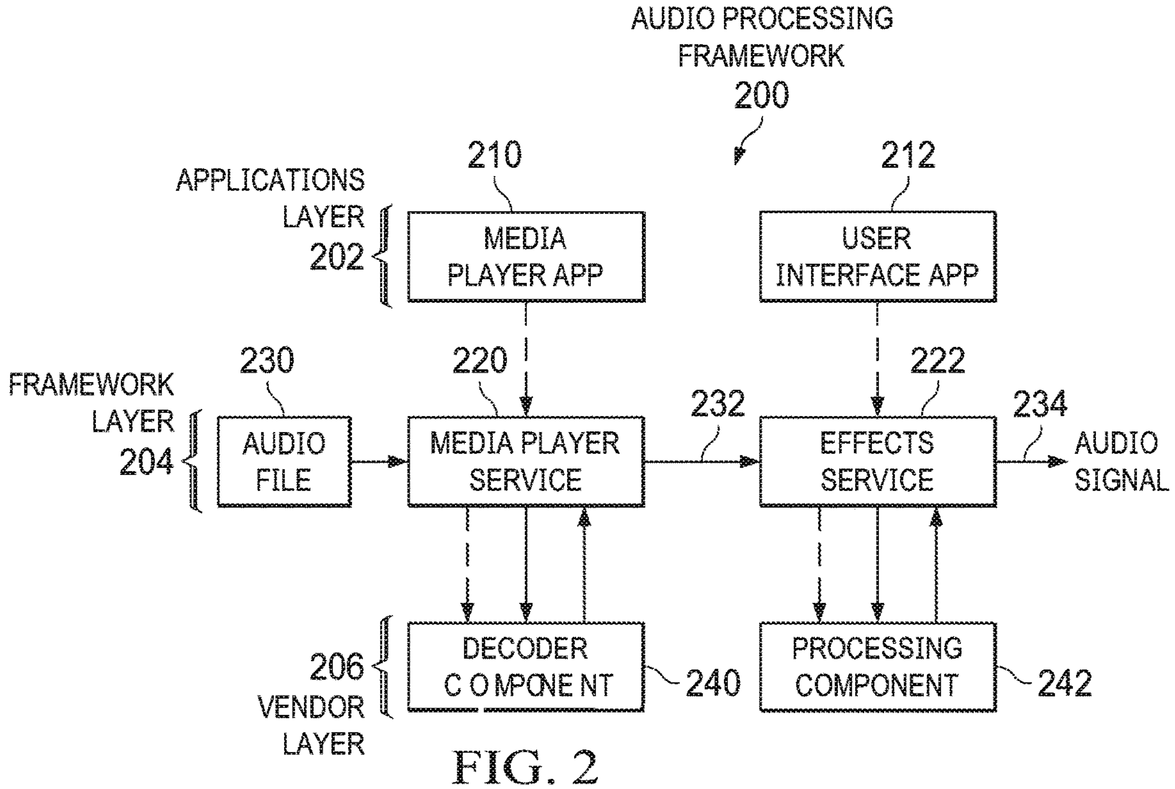
FIG. 2 is a block diagram of an audio processing framework 200.

FIG. 2 is a block diagram of an audio processing framework 200. The audio processing framework 200 may be implemented by the mobile device 100 (see FIG. 1), for example according to the processor 102 executing one or more computer programs or controlling the functionality of dedicated circuit components (DSP, decoder, etc.). Example mobile device operating systems that may be used to implement the audio processing framework 200 include the Android™ mobile operating system, the iOS™ mobile operating system, etc. The audio processing framework 200 includes an applications layer 202, a framework layer 204, and a vendor layer 206. The dotted lines indicate control signals. The audio processing framework 200 may include additional layers or components that (for brevity) are not described in detail.

The applications layer 202 generally includes applications that the mobile device 100 executes to implement various functions. For example, the applications in the application layer 202 may interact with operating system components in the framework layer 204 to implement the media player functionality. This arrangement enables the mobile device 100 to work with multiple applications, each having different functionality, that may be selected by the user according to their preferences. The applications layer 202 includes a media player application 210 and a user interface application 212.

The media player application 210 generally implements the media player functionality for the mobile device 100. The media player application 210 may be one of multiple media player applications on the mobile device 100, each having different functionality. Example functions implemented by the media player application 210 include media file organization (playlists, shuffle play, etc.), media playback (play, pause, skip, etc.), etc. The media player application 210 is generally built as a collection of lower level operating system functions provided by the framework layer 204.

The user interface application 212 generally implements user interface functionality related to the media player functionality of the mobile device 100. In particular to the audio processing framework 200, the user interface application 212 may be used to select various post-processing and audio effects that may be implemented outside of the media player application 210. (The media player application 210 itself may also implement the audio effects, depending upon the implementation.) These audio effects are discussed in more detail below.

The framework layer 204 generally includes framework components, operating system components, services and programming interfaces that the applications in the applications layer 202 use to implement the applications. For example, a particular media player application 210 in the applications layer 202 may be built using specific components in the framework layer 204 to implement the media file organization functionality, the media playback functionality, etc. Specific to the audio processing framework 200, the framework layer 204 includes a media player service 220 and an effects service 222.

The media player service 220 generally includes the framework components that implement the media player functionality. The media player service 220 interacts with the file system of the mobile device 100 to access an audio file 230 (e.g., stored audio data, streaming audio data, etc.). The media player service 220 interacts with various components in the vendor layer 206 (e.g., to perform decoding, etc.), as further discussed below. The media player service 220 processes the audio file 230 and outputs an audio signal 232 to the effects service 222.

The effects service 222 generally includes components that implement post-processing functionality, including audio effects. The effects service 222 interacts with various components in the vendor layer 206 (e.g., to apply various effects), as further discussed below. The effects service 222 applies the audio effects to the audio signal 232 output from the media player service 220 and generates an audio signal 234.

The effects service 222 may also interact with a mixer component (not shown) in the framework layer 204. The mixer component generally mixes in system audio (e.g., alerts, notifications, etc) with the other audio signals. For example, when the user is listening to audio, the mixer may mix in a ring sound to indicate that the mobile device 100 is receiving a telephone call. The mixer component may mix the system audio prior to the effects service 222 (e.g., mixing with the audio signal 232), after the effects service 222 (e.g., mixing with the audio signal 234), etc.

As mentioned above, the components of the framework layer 204 may themselves interact with components in the vendor layer 206.

The vendor layer 206 generally includes components that are developed by entities other than the entity that developed the components in the framework layer 204. For example, the framework layer 204 may implement the Android™ operating system from Google LLC or the iOS™ operating system from Apple Inc.; the vendor layer 206 may implement components from Dolby Laboratories, Inc., Apple Inc., Sony Corp., the Fraunhofer Society, etc. This arrangement allows the components in the vendor layer 206 to extend the functionality of the mobile device 100 beyond the base functionality provided by the framework layer 204 yet remain within the control of the framework layer 204. Specific to the audio processing framework 200, the vendor layer 206 includes a decoder component 240 and a processing component 242.

The decoder component 240 generally performs decoding of the audio file 230. For example, the media player service 220 may invoke a particular decoder component 240 to decode a particular type of audio file 230. The decoder component 240 may also be referred to as a codec component, where "codec" stands for the combination of a coder and a decoder (although generally the term codec may be used even when the component does not perform coding). As mentioned above, the decoder component 240 may be one or more decoder components that implement one or more different decoding processes. For example, when the audio file 230 is an MP3 file, the media player service 220 may interact with an MP3 decoder as the decoder component 240. As another example, when the audio file 230 is a Dolby Digital Plus™ file, the media player service 220 may interact with a Dolby Digital Plus™ decoder as the decoder component 240. Other example decoders include Advanced Audio Coding (AAC) decoders, Apple™ Lossless Audio Codec (ALAC) decoders, etc. A particular decoder component 240 may also apply audio effects, as further discussed below.

The processing component 242 generally performs post-processing on the audio signal 232 to generate the audio signal 234, for example to apply audio effects. For example, the effects service 222 may invoke a particular processing component 242 to apply a particular audio effect to the audio signal 232. The processing component 242 may also be referred to as an effects processing component or a post-processing component. The processing component 242 may be one or more processing components that implement one or more audio effects. Audio effects include volume leveling, volume modeling, dialogue enhancement, and intelligent equalization. Audio effects are discussed in more detail below.

As discussed above, audio effects may be applied by multiple components in the framework layer 204. For example, the media player service 220 may generate the audio signal 232 with an audio effect by processing the audio file 230 using a selected decoder component 240. As another example, the effects service 222 may generate the audio signal 234 with an audio effect by processing the audio signal 232 using a selected processing component 242. When the audio signal 232 has the audio effect applied by the media player service 220, it would be desirable for the effects service 222 to refrain from applying the audio effect in order to avoid double processing.

Unfortunately, in the audio processing framework 200, the audio path is limited to audio signals. The term "audio path" generally refers to the audio input to and output from the media player service 220 and the effects service 222. For example, the audio path may only accept two channels of pulse-code modulation (PCM) samples represented by 16 bit integers. The audio path does not by itself allow additional control signals, metadata, etc. for the media player service 220 to indicate that it has applied an audio effect.

To overcome this limitation, the decoder component 240 inserts an audio watermark into the audio signal 232 to indicate that it has applied an audio effect. When the processing component 242 detects the audio watermark, it does not itself apply the audio effect; otherwise it applies the audio effect. In this manner, using the audio watermark avoids double processing, without requiring additional control signals, metadata, etc. to be passed outside of the audio chain.

Figure 3:
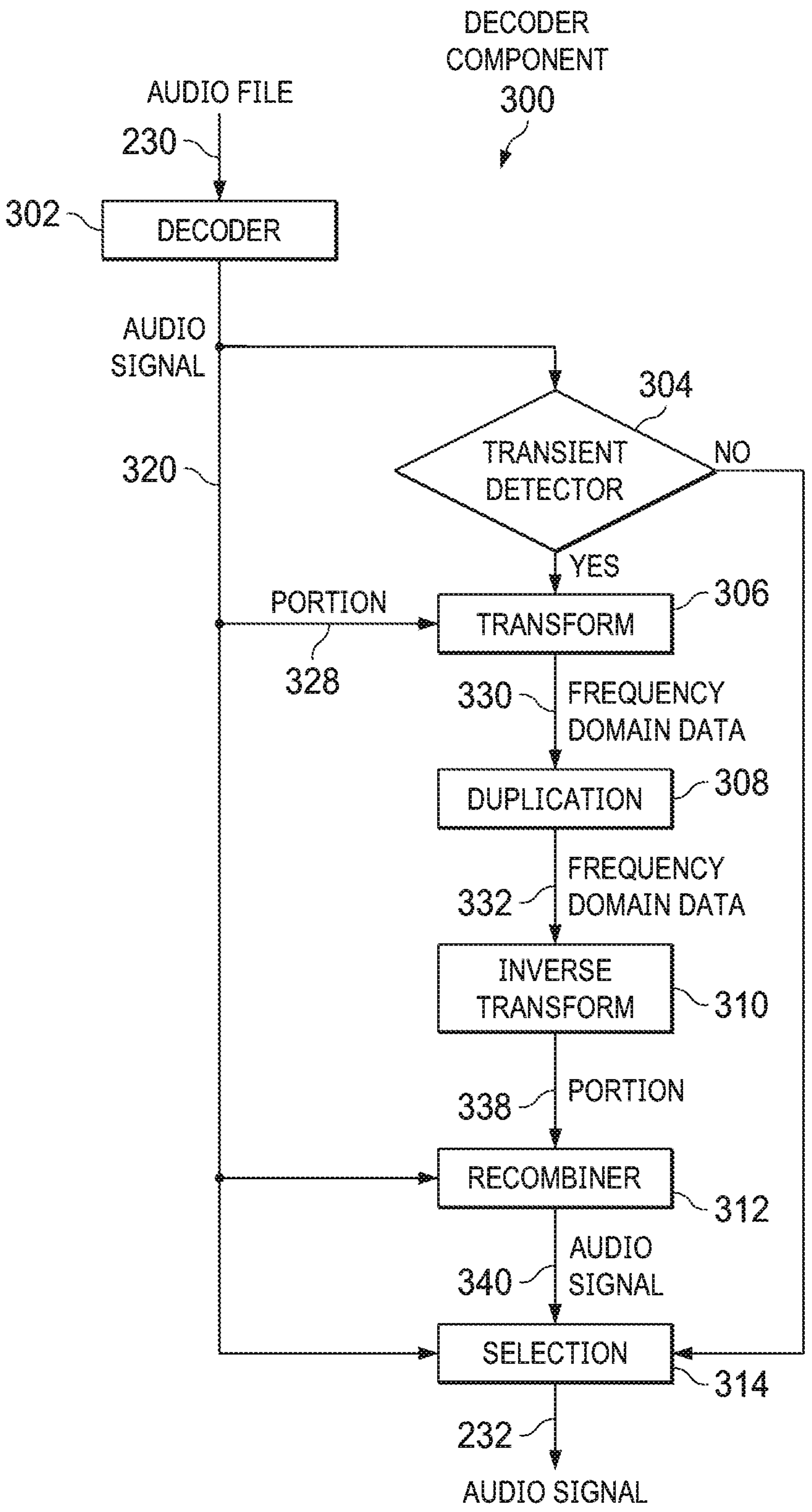
FIG. 3 is a block diagram of a decoder component 300.

FIG. 3 is a block diagram of a decoder component 300. The decoder component 300 is an example of the decoder component 240 (see FIG. 2), and may be implemented by one or more computer programs as components of the vendor layer 206 (see FIG. 2). In general, the decoder component 300 performs decoding on an audio file and selectively inserts an audio watermark when it applies an audio effect to the audio signal. The decoder component 300 includes a decoder component 302, a transient detector 304, a transform component 306, a duplication component 308, an inverse transform component 310, a recombiner component 312, and a selection component 314. The decoder component 300 may include other components that (for brevity) are not discussed in detail.

The decoder component 302 receives the audio file 230 (see FIG. 2), performs decoding on the audio file 230, and generates an audio signal 320. The decoder component 302 may also selectively apply audio effects when generating the audio signal 320. When the decoder component 302 applies an audio effect, the subsequent components of the decoder component 300 (e.g., 304-310) operate to insert an audio watermark. The decoder component 302 may apply the audio effect based on user preferences (e.g., as set according to the user interface application 212 of FIG. 2), machine learning (e.g., according to the decoder component 302 analyzing the audio file 230), etc.

The decoder component 302 may implement one or more decoding processes. In general, the decoding process performed will depend upon the format of the audio file 230. For example, the media player service 220 (in the framework layer 204, see FIG. 2) may select an appropriate decoder component 302 (in the vendor layer 206) based on the audio file 230. Example decoding processes include Dolby Digital Plus™ (DD+) decoding, Dolby Digital Plus™ Joint Object Coding (DD+JOC) decoding, Dolby AC-4™ decoding, Dolby Atmos™ decoding, etc. Dolby Digital Plus™ decoding may also be referred to as Enhanced Dolby Digital AC-3™ (E-AC-3), and may conform to the standard set forth in Annex E of ATSC A/52:2012, as well as Annex E of ETSI TS 102 366 V1.2.1 (2008-08), published by the Advanced Television Systems Committee.

The transient detector 304 detects a transient in the audio signal 320. In general, a transient is a high amplitude, short-duration sound at the beginning of a waveform that occurs in phenomena such as musical sounds, noises or speech. A transient may also be described as a short-duration signal that represents a non-harmonic segment of a sound source. Generally, a transient occurs in the attack portion of the sound, but it also may occur in the release portion. A transient may contain a high degree of nonperiodic components and a greater magnitude of high frequencies than the harmonic content of that sound. A transient need not directly depend on the frequency of the tone it initiates (or terminates).

The transient detector 304 may use one or more processes to detect a transient. For example, the audio signal 320 may be a time domain signal composed of samples, with the samples grouped into units such as blocks, sub-blocks, frames, etc. The transient detector 304 may detect the transient in a particular block of the audio signal 320. The transient detector 304 may examine each block of samples for an increase in energy (above a defined threshold) from one block to the next. The block size and threshold may be adjusted as desired. For example, block sizes of 256 samples, 128 samples, 64 samples, etc. may be used. The threshold may be based on the relative peak levels of adjacent blocks; thresholds between 1.5 and 2.5 may be used, with 2.0 providing good results. The threshold may be lowered in order to detect more transients (e.g., so that a detection becomes more likely as more time passes), or increased to detect fewer (e.g., so that once a detection has occurred, there is less need to detect a subsequent transient in the near term). The transient detector 304 may dynamically adjust the threshold in order to achieve a target rate of transients detected in a given time period (e.g., 1 transient detected per 1 second). As a specific example, the transient detector 304 may implement transient detection as described in "Digital Audio Compression Standard (AC-3, E-AC-3) Revision B", ATSC Document A/52B. When the transient detector 304 does not detect a transient, the decoder component 300 continues processing the audio file 230. (In such a case, the output of the decoder component 300 may be considered to be the audio signal 320.) When the transient detector 304 detects a transient, the flow continues with the components 306-312. When the transient detector 304 does not detect a transient, the flow may skip to the selection component 314.

The transform component 306 transforms a portion 328 of the audio signal 320 related to the transient into frequency domain data 330. For example, when the transient detector 304 detects a transient in a particular block of the audio signal 320, that particular block then corresponds to the portion 328.

The transform component 306 may use one or more transform processes to transform the portion 328. As an example, when the portion 328 is a block of 256 samples, the transform component may perform a fast Fourier transform (FFT) using a block size of 512 points and 256 points of overlap (referred to as a window); alternatively, block sizes of 1024 points or 2048 points may be used.

The transform component 306 may use a Hann (also referred to as a Hanning) window. Other window types may be used as desired. For example, a Hamming window may be used, with parameters $a_0=0.54$ and $a_1=0.46$. As another example, a Blackman window may be used, with parameter $\alpha=0.16$. As another example, a Gaussian window may be used, with parameter $\Delta=0.1$.

The duplication component 308 receives the frequency domain data 330 and duplicates one band (the source band) into another band (the target band) to generate frequency domain data 332. The process of duplication may also be referred to as replication or copying. In the frequency domain data 330, the target band may be referred to as the original target band, and in the frequency domain data 332, the target band may be referred to as the duplicated target band. This replacement of one band by another serves as the audio watermark. Because the replication (duplication) is performed in relation to a detected transient (e.g., after the transient), the perceptual masking may result in improved fidelity.

The duplication component 308 may also perform scaling of the energy in the target band so that the energy level of the duplicated target band matches the energy level of the original target band, instead of the energy level of the source band. For example, the spectral shape of the source band is duplicated, but the energy level of the target band is maintained. The energy level may be represented in decibels (dB).

The duplication component 308 may operate on a variety of spectral bands and ranges. For example, the frequency domain data 330 may range from 0 to 12 kHz, and the source and target bands may have a bandwidth of between 500 and 1500 Hz. This bandwidth may be increased (in order to make detection of the audio watermark easier) or decreased (in order to decrease the likelihood that the watermark affects the listener experience) as desired. Experiments show that a bandwidth of 1000 Hz provides a good balance between detectability (by the processing component 242 of FIG. 2) and imperceptibility (by the listener). The center frequencies of the source and target bands may be located anywhere within 0 to 12 kHz (although copying bands below 3 kHz may result in audibility of the watermark due to inexact copying of low frequency content that has harmonic content); the source and target bands need not be adjacent, and may have other bands between them, Transients can co-exist and be detected with musical and vocal content.

The center frequencies of the bands used as the source and target bands may be adjusted as desired. Experiments show that one reasonable option is the source band includes 3500 Hz (e.g., the center frequency is 3500 Hz) and the target band includes 5500 Hz (e.g., the center frequency is 5500 Hz). Another reasonable option is the source band includes 4500 Hz and the target band includes 6500 Hz.

Combining these bandwidths and center frequencies, one reasonable option is the source band is 3-4 kHz and the target band is 5-6 kHz. Another reasonable option is the source band is 4-5 kHz and the target band is 6-7 kHz.

Although the duplication occurs in the perceptible audio range (e.g., between 3 and 12 kHz), because the duplication is associated with a transient, the audio watermark may be imperceptible to the average listener. This duplication thus serves as a watermark to indicate that the audio effects has been applied. The watermark is referred to as an audio watermark since it occurs within the perceptible audio range, as opposed to being communicated out-of-band using metadata, control signals, etc.

A specific example illustrating the duplication of the source band to the target band is discussed below with reference to FIGS. 5A-5B.

The inverse transform component 310 performs an inverse transform on the frequency domain data 332 to generate a portion 338. The portion 338 thus corresponds to the portion 328, but with the audio watermark (e.g., the source band duplicated into the target band). In general, the inverse transform component 310 performs an inverse of the transform performed by the transform component 306. For example, the inverse transform component may perform an inverse FFT with 512 points using a 256-point window, to generate a block of 256 time-domain samples.

The recombiner component 312 receives the audio signal 320 and the portion 338, and generates an audio signal 340. The audio signal 340 corresponds to the audio signal 320, but with the portion 328 replaced by the portion 338. For example, when the portion corresponds to a block of samples, the recombiner 312 replaces the block containing the transient (the portion 328) with the portion 338.

The selection component 314 receives the audio signal 340 and the audio signal 320, selects one according to whether a transient was detected, and outputs the selection as the audio signal 232 (see also FIG. 2). When the transient detector 304 has not detected a transient, the selection component selects the audio signal 320 (that is, without the audio watermark) as the audio signal 232, When the transient detector 304 has detected the transient, the selection component 314 selects the audio signal 340 (that is, with the audio watermark) as the audio signal 232.

In summary, because the audio watermark is inserted in the audio signal 320 in association with a transient, the presence of the transient serves to diminish the perception of a listener that the audio signal 232 has been modified to contain the audio watermark.

Figure 4:
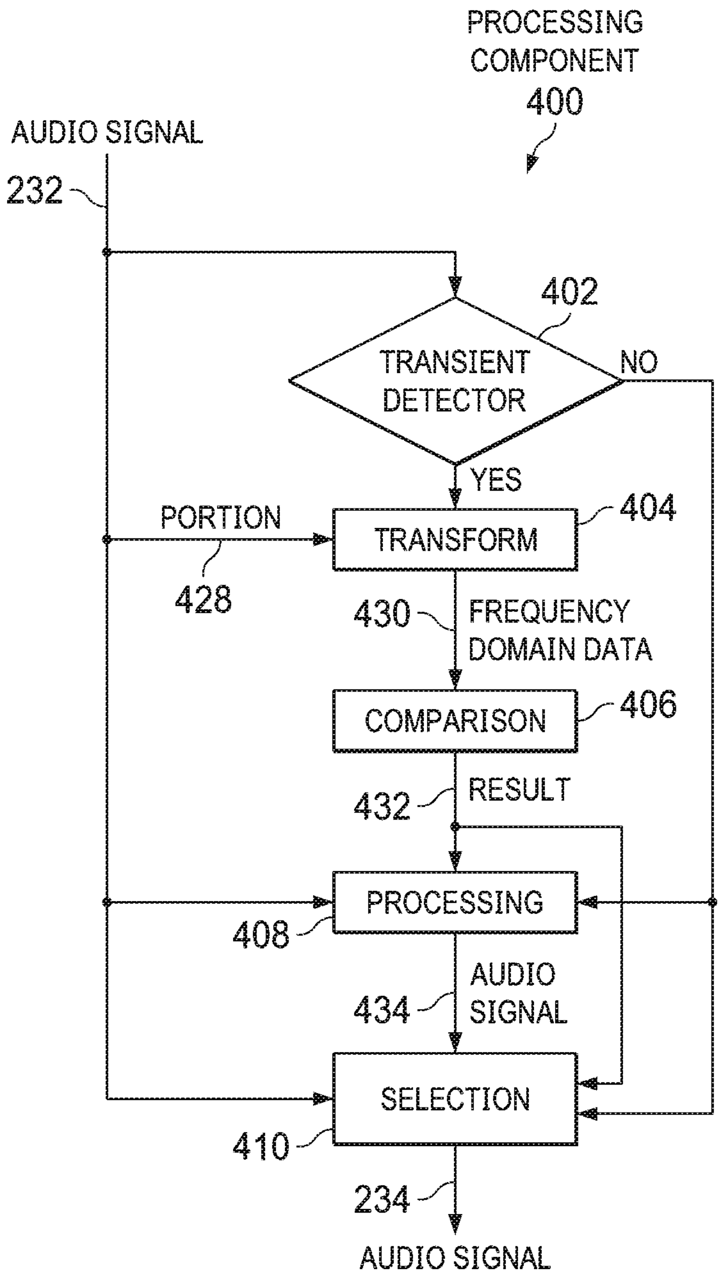
FIG. 4 is a block diagram of a processing component 400.

FIG. 4 is a block diagram of a processing component 400. The processing component 400 is an example of the processing component 242 (see FIG. 2), and may be implemented by one or more computer programs as components of the vendor layer 206 (see FIG. 2). In general, the processing component 400 detects the audio watermark (inserted by the decoder component 240 of FIG. 2, the decoder component 300 of FIG. 3, etc.) and selectively applies audio effects based on the detection. The processing component 400 includes a transient detector 402, a transform component 404, a comparison component 406, a processing component 408, and a selection component 410. The processing component 400 may include other components that (for brevity) are not discussed in detail.

The transient detector 402 detects a transient in the audio signal 232 (see also FIG. 2 and FIG. 3). In general, the transient detector 402 performs a similar transient detection process as performed by the transient detector 304 (see FIG. 3). However, the transient detector 402 may use a lower threshold than the transient detector 304. This allows the transient detector 304 to have a higher threshold so that the audio quality is not degraded, and the transient detector 402 to have a lower threshold in order to improve the detection rate. For example, when the transient detector 304 uses a threshold of 2.0, the transient detector 402 may use a threshold of between 3.0 and 4.0. When the transient detector 402 does not detect a transient, the flow continues with the components 408-410. When the transient detector 402 detects a transient, the flow continues with the components 404-410.

The transform component 404 transforms a portion 428 of the audio signal 232 related to the transient into frequency domain data 430. For example, when the transient detector 402 detects a transient in a particular block of the audio signal 232, that particular block then corresponds to the portion 428. In general, the transform component 404 performs a similar transform process as performed by the transform component 306 (see FIG. 3).

The comparison component 406 receives the frequency domain data 430 and compares the two bands (potentially) duplicated by the decoder component 300 (see FIG. 3). For example, when the decoder component uses 3-4 kHz as the source band is and 5-6 kHz as the target band, the comparison component compares those two bands. In general, the comparison component 406 calculates a correlation between the two bands to generate a result 432. When the result 432 is below a threshold, the two bands are uncorrelated (indicating that the audio watermark is not present), and the flow continues with the components 408-410. When the result 432 is above the threshold, the two bands are correlated (indicating that the audio watermark is present, and the flow continues with the selection component 410.

The processing component 408 selectively processes the audio signal 232, based on the transient detector 402 not detecting a transient or the result 432 indicating the bands are uncorrelated, to generate an audio signal 434. This processing generally corresponds to applying an audio effect to the audio signal 232, as discussed in more detail below. The processing component 408 operates in three modes.

In the first mode, when the transient detector 402 does not detect a transient, the processing component 408 processes the audio signal 232 to generate the audio signal 434. In this mode, with no transient present to provide an audio watermark, the processing component 408 assumes that the decoder component 300 did not apply the audio effect, and so the processing component 408 applies the audio effect to generate the audio signal 434.

In the second mode, when the transient detector 402 detects a transient and the results 432 are uncorrelated, the processing component 408 processes the audio signal 232 to generate the audio signal 434. In this mode, the uncorrelated bands indicate that the decoder component 300 did not apply the audio watermark, and hence did not apply the audio effect; so the processing component 408 applies the audio effect to generate the audio signal 434.

In the third mode, when the transient detector 402 detects a transient and the results 432 are correlated, the processing component 408 does not process the audio signal 232. In this mode, the correlated bands indicate that the decoder component 300 applied the audio watermark, and hence applied the audio effect; so to avoid double processing, the processing component 408 may refrain from operation on the audio signal 232.

In summary, detecting the audio watermark enables the processing component 408 to selectively apply the audio effect, in order to avoid double processing.

The selection component 410 selects the audio signal 434 or the audio signal 232, based on the transient detector 402 not detecting a transient or the result 432 indicating the bands are correlated, to generate the audio signal 234 (see also FIG. 2), The selection component operates in three modes.

In the first mode, when the transient detector 402 does not detect a transient, the selection component 410 selects the audio signal 434 to be the audio signal 234. In this mode, with no transient present, the processing module 408 applies the audio effect to the audio signal 232 to generate the audio signal 434. Because this mode may result in double processing, the transient detector 402 (and the transient detector 304 of FIG. 3) may adjust their thresholds so that transients are detected (and audio water mark insertion occurs) at a desired rate.

In the second mode, when the transient detector 402 detects a transient and the results 432 are correlated, the selection component 410 selects the audio signal 232 to be the audio signal 234. In this mode, the correlated results indicate that the decoder component 300 (see FIG. 3) applied the audio effect to the audio signal 232, so it may be used. In this manner, double processing of the audio signal is avoided.

In the third mode, when the transient detector 402 detects a transient and the results 432 are uncorrelated, the selection component 410 selects the audio signal 434 to be the audio signal 234. In this mode, the uncorrelated results indicate that the decoder component 300 (see FIG. 3) did not apply the audio effect to the audio signal 232, so the audio signal 434 (with the audio effect applied by the processing component 408) may be used. In this manner, the audio effect may be reliably applied while avoiding double processing, without requiring metadata or other out-of-band control signals between components.

Audio Effects

As discussed above, audio effects may be applied by various components of the audio processing framework 200 (see FIG. 2), including the decoder 302 (see FIG. 3), the processing component 408 (see FIG. 4), etc. Audio effects are generally applied after decoding or other audio processing, so audio effects may also be referred to as post-processing. Audio effects may modify audio signals based on cognitive and psychoacoustic models of human audio perception. Multiple audio effects may be bundled together; an example effects bundle is Dolby Audio Processing™. Audio effects may include volume leveling, volume modeling, dialogue enhancement, and intelligent equalization.

Volume leveling describes an effect that maintains consistent playback levels regardless of the source selection and content. For example, when the user switches between different songs in a playlist or switches from listening to music to watching a movie, the volume stays the same. This feature may continuously analyze the audio based on a psychoacoustic model of loudness perception to assess how loud a listener perceives the audio to be. This information is then used to automatically adjust the perceived loudness to a consistent playback level. The volume leveling may be performed using auditory scene analysis, a cognitive model of audio perception developed through analyzing data about audio sources. This ensures that the loudness of the audio is not adjusted in the audio signal at inappropriate moments, such as during a naturally decaying note in a song. The volume leveler may adjust individual channels of the audio and individual frequency bands within a channel to prevent unwanted compression-based "pumping" and "breathing" artifacts. The result is consistently leveled audio, free from the artifacts associated with traditional volume-leveling solutions.

Volume modeling describes an effect that compensates for the reference level used for audio mixing. In the recording studio, audio is mixed at what audio professionals refer to as the reference level, typically around 85 decibels. Although this is generally considered loud, it's the volume level at which most people can perceive the entire spectrum of audio in a mix and hear the intended tonal balance. This is important because of how we actually hear. Typically, the lower the volume, the less well we can hear the high and low audio frequencies—the treble and bass. Traditional volume controls, however, treat all frequencies alike. So when you turn down the volume, you lose the perception of the high and low audio frequencies and the tonal balance suffers. To compensate for this, the volume modeler analyzes the incoming audio, groups similar frequencies into critical bands, and applies appropriate amounts of gain to each.

Dialogue enhancement describes an effect that dynamically applies processing to improve the intelligibility of the spoken portion of audio. This postprocessing feature is designed to improve dialogue perception and understanding for listeners. This involves monitoring the audio track to detect the presence of dialogue. The dialogue enhancer analyzes features from the audio signal and applies pattern recognition to detect the presence of dialogue from moment to moment. When dialogue is detected, the Dialogue Enhancer may perform two types of dynamic audio processing: dynamic spectral rebalancing of dialogue, and dynamic suppression of intrusive signals (although other techniques may also be used).

The dynamic spectral rebalancing of dialogue enhances the middle to high frequencies, which are most important to intelligibility. In simple terms, the speech spectrum is altered where necessary to accentuate the dialogue content in a way that allows the listener to more clearly distinguish the content.

Dynamic suppression of intrusive signals lowers the level of middle to high frequencies of sounds in the audio mix that are not related to dialogue. These are sounds that are determined to be interfering with the intelligibility of the dialogue.

Intelligent equalization describes an effect directed toward providing consistency of spectral balance, also known as timbre. This is accomplished by continuously monitoring the spectral balance of the audio and comparing it to a specified spectral profile (or timbre), known as the reference spectral profile. An equalization filter dynamically transforms the original audio tone to the specified reference spectral profile. This process is different from existing equalization presets found on many audio systems (such as presets for jazz, rock, or voice), where the presets apply the same change across a frequency, regardless of the content. Typically, when a user sets a bass boost level in a traditional equalizer, the setting may not be appropriate as the bass content in the source audio increases; too much bass may cause distortion. The intelligent equalizer does not adjust the bass if sufficient bass is evident in the signal. When the source audio does not have enough bass, the intelligent equalizer boosts the bass appropriately. The result is the desired sound without over-processing or distortion.

Figure 5A:
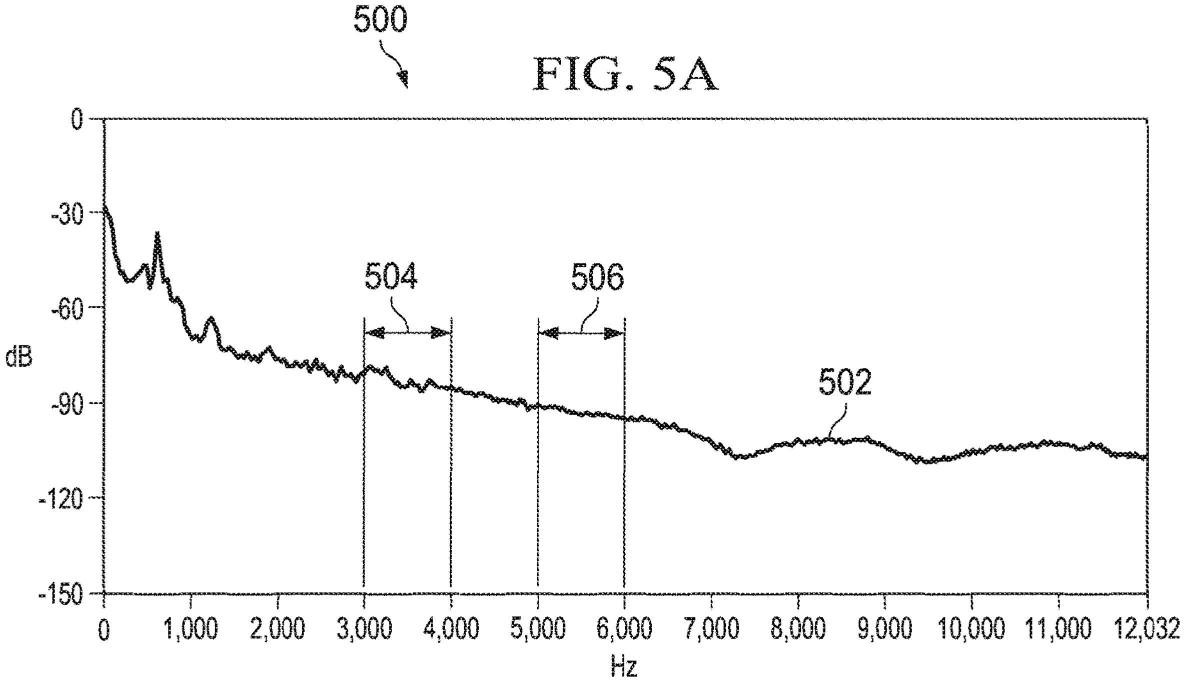
FIGS. 5A-5B are graphs that illustrate spectral copying for the audio watermark.
Figure 5B:
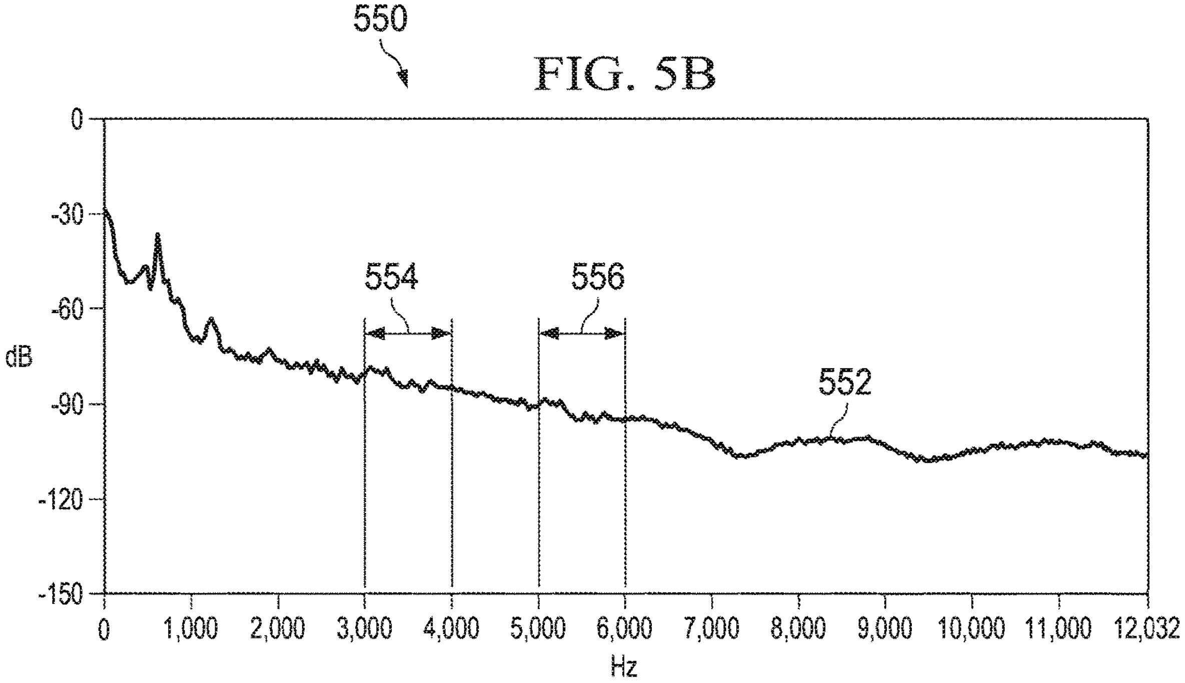

FIGS. 5A-5B are graphs that illustrate spectral copying for the audio watermark. FIG. 5A is a graph 500 with loudness in dB on the y-axis and frequency in Hz on the x-axis. A spectrum 502 corresponds to the audio signal prior to insertion of the audio watermark (e.g., the audio signal 320 of FIG. 3). The band 504 (at 3-4 kHz) is the source band, and the band 506 (at 5-6 kHz) is the target band.

FIG. 5B shows a graph 550 where a spectrum 552 corresponds to the audio signal after insertion of the audio watermark (e.g., the audio signal 340 of FIG. 3). In the spectrum 552, the source band 554 is the same as the source band 504 in the spectrum 550, but the target band 556 corresponds to a duplication of the source band 554, not the target band 506 in the spectrum 550. Further note that the target band 556 is scaled so that the energy is continuous with the adjacent bands of the spectrum 552, instead of just copying the loudness of the source band 554.

Figure 6:
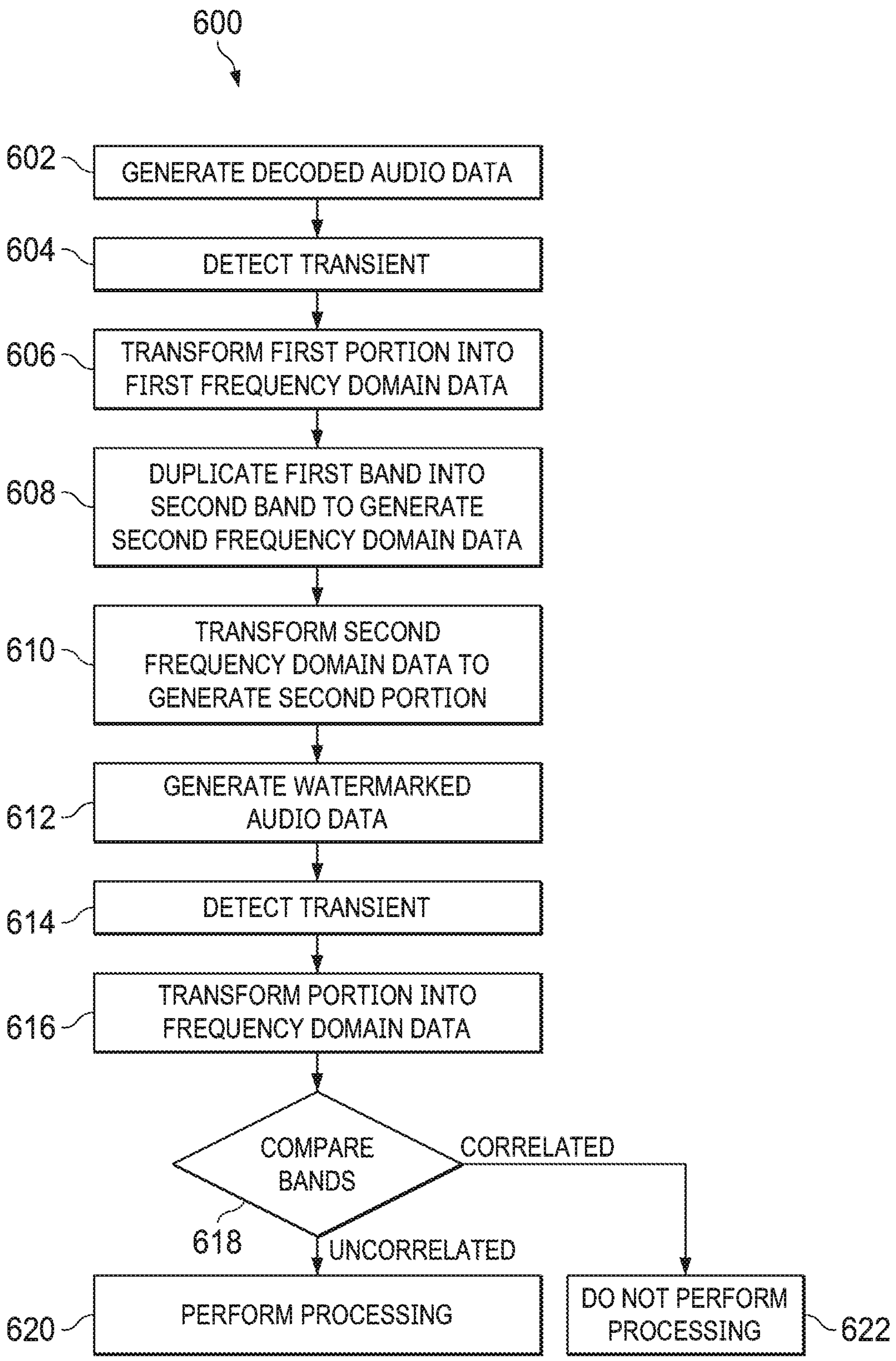
FIG. 6 is a flow diagram of a method 600 of audio processing.

FIG. 6 is a flow diagram of a method 600 of audio processing. The method 600 generally inserts an audio watermark to communicate that an effect has been added to audio, so that subsequent components may avoid performing double processing. The method 600 may be performed by the mobile device 100 (see FIG. 1), for example as controlled by one or more computer programs. The method 600 may be implemented by one or more components of the audio processing framework (see FIG. 2), the decoder component 300 (see FIG. 3), the processing component 400 (see FIG. 4), etc.

At 602, encoded audio data is decoded to generate decoded audio data. For example, the decoder component 302 (see FIG. 3) may decode the audio file 230 to generate the audio signal 320. The encoded audio data may include metadata, and generating the decoded audio data may include processing the metadata as part of the decoding process. Generating the decoded audio data may also include applying an audio effect. Because the method 600 is directed to avoiding double processing when the decoder component 302 applies the audio effect, the remainder of this discussion regarding the method 600 assumes that the audio effect has been applied.

At 604, a transient is detected in the decoded audio data. For example, the transient detector 304 (see FIG. 3) may detect the transient. Because the method 600 is directed to inserting the audio watermark in the transient, the remainder of this discussion regarding the method 600 assumes that the transient has been detected.

At 606, a first portion of the decoded audio data related to the transient in the decoded audio data is transformed into first frequency domain data. The first portion may correspond to a block of samples. For example, the transform component 306 (see FIG. 3) may transform the portion 328 of the audio signal 320 to generate the frequency domain data 330.

At 608, a first band of the first frequency domain data is duplicated into a second band of the first frequency domain data to generate second frequency domain data. This duplication may also include scaling the energy in the duplicated target band to match that of the original target band. For example, the duplication component 308 (see FIG. 3) may duplicate the source band 554 (see FIG. 5B) into the target band 556, with the energy in the target band 556 matching the energy in the original target band 506 (see FIG. 5A).

At 610, the second frequency domain data is transformed to generate a second portion. For example, the inverse transform component 310 (see FIG. 3) may transform the frequency domain data 332 to generate the portion 338.

At 612, watermarked audio data is generated, where the watermarked audio data corresponds to the decoded audio data having the first portion replaced with the second portion. For example, the recombiner component 312 (see FIG. 3) may generate the audio signal 340 corresponding to the audio signal 320, but with the portion 328 replaced by the portion 338.

At 614, a transient is detected in first audio data. (In general, the first audio data corresponds to the watermarked audio data of 612; however, at the time of 614 the presence of the watermark is unknown, so the label "first audio data" is used.) For example, the transient detector 402 (see FIG. 4) may detect a transient in the audio signal 232. Because the method 600 is directed to detecting the audio watermark in the transient, the remainder of this discussion regarding the method 600 assumes that the transient has been detected.

At 616, a portion of the first audio data related to the transient is transformed into frequency domain data. For example, the transform component 404 (see FIG. 4) may transform the portion 428 of the audio signal 232 to generate the frequency domain data 430.

At 618, a first band of the frequency domain data and a second band of the frequency domain data are compared. For example, the comparison component 406 (see FIG. 4) may compare two bands in the frequency domain data 430 to generate the results 432.

At 620, when the first band is uncorrelated with the second band, processing is performed on the first audio data to generate second audio data. The uncorrelated bands indicate that the audio watermark is not present. In this situation, the first audio data does not have the audio effect, so it needs to be applied. For example, the processing component 408 (see FIG. 4) may process the audio signal 232 to generate the audio signal 434 when the bands are uncorrelated.

At 622, when the first band is correlated with the second band, the first audio data is used as the second audio data without performing processing. The correlated bands indicate the presence of the audio watermark. In this situation, the first audio data has the audio effect, so (to avoid double processing) the first audio data is used as the second audio data, without applying an audio effect. For example, the selection component 410 (see FIG. 410) may select the audio signal 232 to use as the audio signal 234, based on the result 432 indicating the correlation between the bands.

Variations and Options

In FIG. 2, the decoder component 240 and the processing component 242 are shown as components of the vendor layer 206 in a mobile device 100. However, these components may be in separate devices. For example, the decoder component may be located in a server that streams the audio signal 232 to a mobile device that contains the processing component. In such an embodiment, the watermarking (when the server applies the effect) enables the mobile device to avoid double processing the audio.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

Various aspects of the present invention may be appreciated from the following enumerated example embodiments (EEEs):

EEE 1. A method of audio processing, the method comprising:

detecting, by a processing component, a transient in first audio data;

transforming a portion of the first audio data related to the transient into frequency domain data;

comparing a first band of the frequency domain data and a second band of the frequency domain data;

when the first band is uncorrelated with the second band, performing processing by the processing component on the first audio data to generate second audio data; and when the first band is correlated with the second band, using the first audio data as the second audio data without performing processing by the processing component.

EEE 2. The method of EEE 1, wherein prior to detecting the transient in the first audio data, the method further comprises:

decoding, by a decoder component, third audio data to generate fourth audio data;

detecting a transient in the fourth audio data, wherein the transient in the fourth audio data corresponds to the transient in the first audio data;

transforming a first portion of the fourth audio data related to the transient in the fourth audio data into first frequency domain data;

duplicating a first band of the first frequency domain data into a second band of the first frequency domain data to generate second frequency domain data;

transforming the second frequency domain data to generate a second portion; and generating fifth audio data, wherein the fifth audio data corresponds to the fourth audio data having the first portion replaced with the second portion, wherein the fifth audio data corresponds to the first audio data.

EEE 3. The method of EEE 2, wherein the third audio data includes an audio signal and metadata, wherein decoding the third audio data comprises decoding the audio signal and the metadata to generate the fourth audio data.

EEE 4. The method of any one of EEEs 2-3, wherein decoding the third audio data further comprises:

applying an audio effect to generate the fourth audio data.

EEE 5. The method of any one of EEEs 2-4, wherein prior to copying the first band into the second band, the first hand has a first energy level and the second band has a second energy level, wherein copying the first band into the second band includes scaling the first energy level to the second energy level.

EEE 6. The method of any one of EEEs 1-5, wherein performing processing by the processing component on the first audio data to generate the second audio data comprises:

applying an audio effect to the first audio data.

EEE 7. The method of EEE 6, wherein the audio effect is at least one of a volume leveler effect, a volume modeler effect, a dialogue enhancer effect, and an intelligent equalizer effect.

EEE 8. The method of any one of EEEs 1-7, wherein the first portion comprises a plurality of samples of the first audio data that includes the transient.

EEE 9. The method of any one of EEEs 1-8, wherein the first band is a band that includes 3500 Hz and the second band is a band that includes 5500 Hz.

EEE 10. The method of any one of EEEs 1-8, wherein the first band is a band that includes 4500 Hz and the second band is a band that includes 6500 Hz.

EEE 11. The method of any one of EEEs 1-10, wherein the first band and the second band each have a bandwidth of between 500 and 1500 Hz.

EEE 12. The method of any one of EEEs 1-10, wherein the first band and the second band each have a bandwidth of 1000 Hz.

EEE 13. The method of any one of EEEs 1-12, wherein the frequency domain data includes a third band, wherein the third band is between the first band and the second band.

EEE 14. The method of any one of EEEs 1-13, wherein the frequency domain data is within a perceptible audio range.

EEE 15. The method of any one of EEEs 1-14, wherein the frequency domain data is between 3 and 12 kHz.

EEE 16. A non-transitory computer readable medium storing a computer program that, when executed by a processor, controls an apparatus to execute processing including the method of any one of EEEs 1-15.

EEE 17. An apparatus for audio processing, the apparatus comprising:

a processor; and a memory, wherein the processor is configured to control the apparatus to detect, by a processing component, a transient in first audio data;

wherein the processor is configured to control the apparatus to transform a portion of the first audio data related to the transient into frequency domain data;

wherein the processor is configured to control the apparatus to compare a first band of the frequency domain data and a second band of the frequency domain data;

wherein, when the first band is uncorrelated with the second band, the processor is configured to control the apparatus to perform processing by the processing component on the first audio data to generate second audio data; and wherein, when the first band is correlated with the second band, the processor is configured to control the apparatus to use the first audio data as the second audio data without performing processing by the processing component.

EEE 18. The apparatus of EEE 17, wherein prior to detecting the transient in the first audio data:

the processor is configured to control the apparatus to decode, by a decoder component, third audio data to generate fourth audio data;

the processor is configured to control the apparatus to detect a transient in the fourth audio data, wherein the transient in the fourth audio data corresponds to the transient in the first audio data;

the processor is configured to control the apparatus to transform a first portion of the fourth audio data related to the transient in the fourth audio data into first frequency domain data;

the processor is configured to control the apparatus to duplicate a first band of the first frequency domain data into a second band of the first frequency domain data to generate second frequency domain data;

the processor is configured to control the apparatus to transform the second frequency domain data to generate a second portion; and the processor is configured to control the apparatus to generate fifth audio data, wherein the fifth audio data corresponds to the fourth audio data having the first portion replaced with the second portion, wherein the fifth audio data corresponds to the first audio data.

EEE 19. The apparatus of any one of EEEs 17-18, wherein prior to copying the first band into the second band, the first band has a first energy level and the second band has a second energy level, wherein copying the first band into the second band includes scaling the first energy level to the second energy level.

EEE 20. The apparatus of any one of EEEs 17-19, wherein the frequency domain data is within a perceptible audio range.

The invention claimed is:

1. A method of audio processing, the method comprising:

detecting, by a processing component, a transient in first audio data;

transforming a portion of the first audio data related to the transient into frequency domain data;

comparing a first band of the frequency domain data and a second band of the frequency domain data;

when the first band is uncorrelated with the second band, performing processing by the processing component on the first audio data to generate second audio data; and when the first band is correlated with the second band, using the first audio data as the second audio data without performing processing by the processing component.

2. The method of claim 1, wherein prior to detecting the transient in the first audio data, the method further comprises:

decoding, by a decoder component, third audio data to generate fourth audio data;

detecting a transient in the fourth audio data, wherein the transient in the fourth audio data corresponds to the transient in the first audio data;

transforming a first portion of the fourth audio data related to the transient in the fourth audio data into first frequency domain data;

duplicating a first band of the first frequency domain data into a second band of the first frequency domain data to generate second frequency domain data;

transforming the second frequency domain data to generate a second portion; and generating fifth audio data, wherein the fifth audio data corresponds to the fourth audio data having the first portion replaced with the second portion, wherein the fifth audio data corresponds to the first audio data.

3. The method of claim 2, wherein the third audio data includes an audio signal and metadata, wherein decoding the third audio data comprises decoding the audio signal and the metadata to generate the fourth audio data.

4. The method of claim 2, wherein decoding the third audio data further comprises:

applying an audio effect to generate the fourth audio data.

5. The method of claim 2, wherein prior to duplicating the first band into the second band, the first band has a first energy level and the second band has a second energy level, wherein duplicating the first band into the second band includes scaling the first energy level to the second energy level.

6. The method of claim 1, wherein performing processing by the processing component on the first audio data to generate the second audio data comprises:

applying an audio effect to the first audio data.

7. The method of claim 6, wherein the audio effect is at least one of a volume leveler effect, a volume modeler effect, a dialogue enhancer effect, and an intelligent equalizer effect.

8. The method of claim 1, wherein the first portion comprises a plurality of samples of the first audio data that includes the transient.

9. The method of claim 1, wherein the first band is a band that includes 3500 Hz and the second band is a band that includes 5500 Hz.

10. The method of claim 1, wherein the first band is a band that includes 4500 Hz and the second band is a band that includes 6500 Hz.

11. The method of claim 1, wherein the first band and the second band each have a bandwidth of between 500 and 1500 Hz.

12. The method of claim 1, wherein the first band and the second band each have a bandwidth of 1000 Hz.

13. The method of claim 1, wherein the frequency domain data includes a third band, wherein the third band is between the first band and the second band.

14. The method of claim 1, wherein the frequency domain data is within a perceptible audio range.

15. The method of claim 1, wherein the frequency domain data is between 3 and 12 kHz.

16. A non-transitory computer readable medium storing a computer program that, when executed by a processor, controls an apparatus to execute processing including the method of claim 1.

17. An apparatus for audio processing, the apparatus comprising:

a processor; and a memory, wherein the processor is configured to control the apparatus to detect, by a processing component, a transient in first audio data;

wherein the processor is configured to control the apparatus to transform a portion of the first audio data related to the transient into frequency domain data;

wherein the processor is configured to control the apparatus to compare a first band of the frequency domain data and a second band of the frequency domain data;

wherein, when the first band is uncorrelated with the second band, the processor is configured to control the apparatus to perform processing by the processing component on the first audio data to generate second audio data; and wherein, when the first band is correlated with the second band, the processor is configured to control the apparatus to use the first audio data as the second audio data without performing processing by the processing component.

18. The apparatus of claim 17, wherein prior to detecting the transient in the first audio data:

the processor is configured to control the apparatus to decode, by a decoder component, third audio data to generate fourth audio data;

the processor is configured to control the apparatus to detect a transient in the fourth audio data, wherein the transient in the fourth audio data corresponds to the transient in the first audio data;

the processor is configured to control the apparatus to transform a first portion of the fourth audio data related to the transient in the fourth audio data into first frequency domain data;

the processor is configured to control the apparatus to duplicate a first band of the first frequency domain data into a second band of the first frequency domain data to generate second frequency domain data;

the processor is configured to control the apparatus to transform the second frequency domain data to generate a second portion; and the processor is configured to control the apparatus to generate fifth audio data, wherein the fifth audio data corresponds to the fourth audio data having the first portion replaced with the second portion, wherein the fifth audio data corresponds to the first audio data.

19. The apparatus of claim 18, wherein prior to duplicating the first band into the second band, the first band has a first energy level and the second band has a second energy level, wherein duplicating the first band into the second band includes scaling the first energy level to the second energy level.

20. The apparatus of claim 17, wherein the frequency domain data is within a perceptible audio range.

* * * * *